Patented May 26, 1953

2,640,047

UNITED STATES PATENT OFFICE 2,640,047

REACTION PRODUCTS OF A POLYHALOGENATED COMPOUND AND A TRIAZINE DERIVATIVE AND METHODS OF PREPARING THE SAME

Jack T. Thurston, Old Greenwich, Conn., assignor to American Cyanamid Company, New York, N. Y., a corporation of Maine No Drawing. Application May 10, 1951, Serial No. 225,681

15 Claims. (Cl. 260—79)

This invention relates to new synthetic materials having particular utility in the plastics and coating arts and to methods of preparing the same. More particularly the invention is concerned with compositions comprising a resinous material or composition which is obtained by effecting reaction between ingredients including (1) a triazine derivative represented by the general formula

I

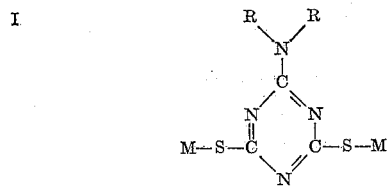

where R represents a member of the class consisting of hydrogen and monovalent hydrocarbon radicals, more particularly alkyl, cycloalkyl, aralkyl, aryl and alkaryl radicals, and M represents an alkali metal (e. g., potassium, sodium, etc.) and (2) a compound having at least two but not more than three halogen atoms (more particularly chlorine or bromine atoms) attached to a radical selected from the group consisting of polyvalent hydrocarbon and oxyhydrocarbon (including hydroxyhydrocarbon) radicals, each halogen being attached to a carbon atom in which all four valences are satisfied by single bonds.

Illustrative examples of monovalent hydrocarbon radicals represented by R in Formula I, and which can be the same or different, are methyl, ethyl, propyl, butyl, isopropyl, isobutyl, amyl, octyl, decyl, octadecyl, 2-ethylhexyl, phenyl, naphthyl, xenyl, cyclopentyl, cyclohexyl, cycloheptyl, tolyl, xylyl, ethylphenyl, benzyl, phenylethyl, tolylethyl, phenylpropyl, etc.

Examples of polyhalogenated compounds that can be used are as follows:

II   $XC_2H_4OCH_2OC_2H_4X$

III  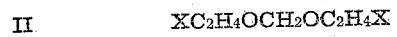

IV   $XC_2H_4X$

V    $XC_2H_4OC_2H_4OC_2H_4X$

VI   $XC_2H_4OC_2H_4OC_2H_4OC_2H_4X$

VII  $XC_2H_4OC_2H_4X$

VIII $XCH_2CHOHCH_2X$

IX   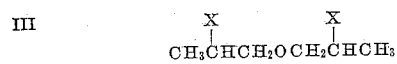

X    $XCH_2OC_2H_4OC_2H_4OCH_2X$

XI   

XII  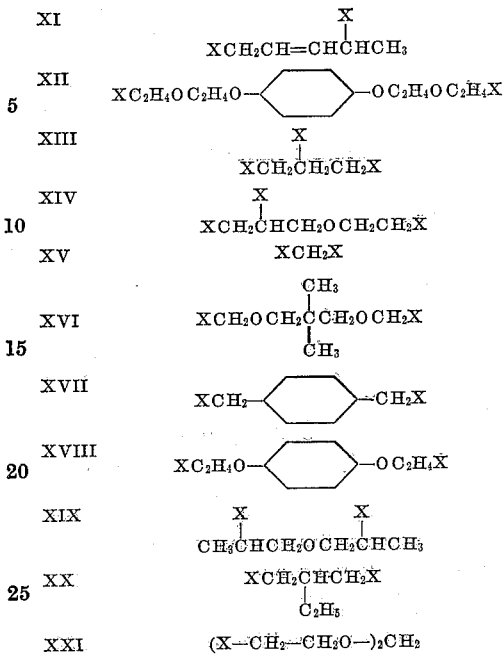

XIII 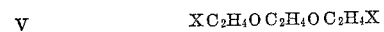

XIV  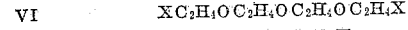

XV   $XCH_2X$

XVI  

XVII 

XVIII 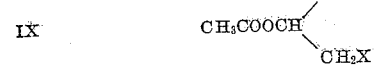

XIX  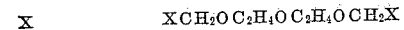

XX   $XCH_2CHCH_2X$
     |
     $C_2H_5$

XXI  $(X-CH_2-CH_2O-)_2CH_2$

In the above formulas X represents chlorine or bromine. In the compounds represented by these formulas and in other di- and trihalogenated (di- and trichlorinated or di- and tribrominated) compounds used in practicing my invention, each halogen is attached to a carbon atom in which all four valences are satisfied by single bonds. The grouping containing the halogen is further characterized by being a hydrocarbon or an oxyhydrocarbon radical. Included within these classes of radicals are the acyclic hydrocarbon radicals, acyclic oxyhydrocarbon radicals, and aromatic-substituted aliphatic radicals in which latter the aliphatic portion is either an acyclic hydrocarbon or an acyclic oxyhydrocarbon radical.

It is an object of the present invention to prepare a new class of synthetic materials, more particularly resinous compositions, which have particular utility in the plastics and coating arts as such, or as components of plastics and coating compositions, or as intermediates in the preparation of other resinous materials which are especially suitable for use in such fields.

Another object of the present invention is to prepare a new class of linear polymeric materials of the thermoplastic type, but which can be rendered thermosetting or potentially thermosetting by reaction with an aldehyde, specifically formaldehyde.

A further object of the invention is to provide an economical and efficient method by which the new synthetic materials described in the first paragraph of this specification may be prepared.

Other objects of the invention will be apparent to those skilled in the art as the description of the invention proceeds.

In practicing my invention reaction is effected between ingredients including a triazine derivative of the kind embraced by Formula I and a polyhalogenated compound of the kind described hereinabove. The reaction is essentially a condensation reaction to form a linear polymer, and may be represented by the following equation using, by way of example, $\beta,\beta'$-dichloroethyl ether as the polyhalogenated compound and a disodium salt of dithioammelide as the triazine derivative:

XXII

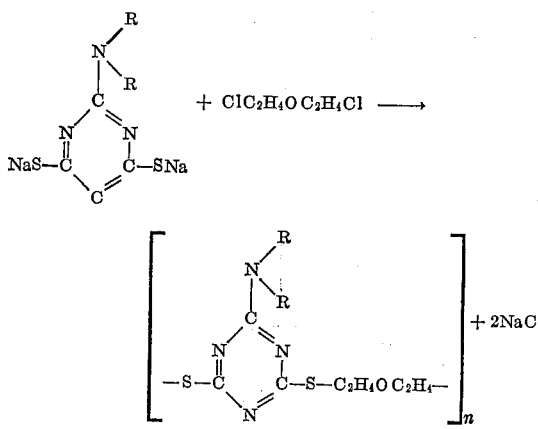

In the above equation R has the meaning given above and $n$ represents the number of units in the linear polymer. The equation illustrates the reaction of the triazine derivative with a dihalogenated compound. When a trihalogenated compound is employed, the resulting polymer will be mostly three-dimensional, as will be fully understood by those skilled in the art.

The proportions of the triazine derivative and the polyhalogenated compound may be considerably varied, e. g. from approximately equimolecular proportions of each reactant to from 2 to 3 moles of the polyhalogenated compound per mole of the triazine derivative. I prefer, however, to use the polyhalogenated compound and the triazine derivative in approximately stoichiometrical proportions.

The reaction may be effected in the presence or absence of an inert medium such as water, ethylene glycol monoethyl ether, dioxane, toluene, xylene, etc. If water is employed as the reaction medium, it is often preferable to add a small quantity of an emulsifying agent in order to assure intimate contact of the two reactants which, in turn, results in the formation of a polymer of a molecular weight higher than that obtained without an emulsifying agent. Examples of suitable emulsifying agents are fatty alcohol sulfates (e. g., lauryl sulfate, oleyl sulfate, etc.), ammonium caseinate, sulfosuccinate esters (e. g., dioctyl sulfosuccinate), sulfonated castor oil, and the like. The preferred method of operating when an emulsifying agent is utilized, is to form a preliminary emulsion of the halogenated compound in water. This emulsion is then added to a mixture of the triazine derivative and water under reacting conditions.

In general, the reaction is accelerated by heat. It is preferred to conduct the reaction at a temperature not exceeding 150° C. thereby minimizing or obviating possible side reactions. It is usually necessary to employ a minimum temperature of approximately 70–80° C. in order to obtain a satisfactory rate of reaction. The total time of reaction will vary considerably depending, for example, upon the size of the batch, the particular reactants employed and other influencing factors. Ordinarily, the reaction is complete or substantially complete in from about ½ hour to about 7 or 8 hours.

It is seldom necessary to vary the pressure from atmospheric. The majority of reactants will provide a good yield without increased pressure. However, when employing a relatively low-boiling halide such as ethylene dichloride, it is sometimes preferable to increase the pressure to as high as 2 or 3 atmospheres.

In some cases it may be desirable to use a mixture of triazine derivatives of the kind embraced by Formula I instead of a single triazine derivative. In this way, and as is shown by some of the examples which follow, the reactivity of a sluggish triazine derivative with a particular polyhalogenated compound is enhanced by the presence of a second, more reactive triazine derivative. The properties of the final products also may be varied by using a plurality of halogenated compounds with a single triazine derivative or with a plurality of triazine derivatives. It is to be understood that the alkali-metal salt or salts of the triazine derivative may be formed in situ as will be shown in later examples.

In order that those skilled in the art may better understand how the present invention may be carried into effect, the following examples are given by way of illustration and not by way of limitation. All parts are by weight unless otherwise specified.

*Example 1*

Into a reaction vessel equipped with a stirrer, reflux condenser and thermometer, are placed 5.44 parts of N,N-dibutyl dithioammelide and 28.8 parts of dithioammelide. This mixture is dissolved in a solution of 16.6 parts of sodium hydroxide in 250 parts of water to form the disodium salts of the triazine derivatives. Through a dropping funnel, 36.7 parts of $\beta,\beta'$-dichloroethyl ether is added and the solution is refluxed for 3 hours. A cream-colored agglomerate forms within 15 minutes of the initial reflux. The precipitate present at the end of the 3 hours' reflux is repeatedly washed in hot water until the wash water gives a negative test for chloride ion. The product is a gray solid which is flexible when hot and which stiffens on cooling. The product is placed in a vacuum desiccator to dry. The yield is approximately 95% of the theoretical.

*Example 2*

Similar results are obtained using the procedure of Example 1 with the following ingredients:

| | Parts |
|---|---|
| N-cyclohexyl dithioammelide | 205 |
| $\beta,\beta'$-Dichloroethyl formal | 190 |
| Sodium hydroxide | 80 |
| Water | 1200 |

Example 3

The procedure of Example 1 is followed using the following ingredients:

| | Parts |
|---|---|
| N-phenyl dithioammelide | 210 |
| $\beta,\beta'$-Dichloroethyl formal | 190 |
| Sodium hydroxide | 80 |
| Water | 1200 |

There is obtained about 90% yield of a gray, brittle, solid possessing thermoplastic characteristics. The solid is almost completely soluble in ethylene glycol monoethyl ether.

Example 4

The procedure of Example 1 is followed using the following ingredients:

| | Parts |
|---|---|
| N,N-ditolyl dithioammelide | 294 |
| $\beta,\beta'$-Dichloroethyl formal | 190 |
| Sodium hydroxide | 80 |
| Water | 1200 |

Results similar to those of Example 1 are obtained.

Example 5

To 125 parts of water are added 35.8 parts of $\beta,\beta'$-dichloroethyl ether and 3 parts of lauryl sulfate. This mixture is emulsified by two passages through a homogenizer. The creamy mixture which results is then placed in a reaction vessel equipped with a stirrer, reflux condenser and dropping funnel, and is warmed to approximately 80° C. Meanwhile 45.5 parts of monosodium dithioammelide is dissolved in a solution of 10 parts of sodium hydroxide in 125 parts of water to form the disodium salt. This solution is filtered to give a clear, highly refractive solution which is then added slowly to the previously prepared emulsion over a period of 20 minutes. The reaction mixture is then heated for a period of 3 hours at 95° C., after which it is cooled and filtered. The solid product is washed with distilled water by simply stirring a water slurry, allowing the solids to settle and drawing off the supernatant liquid. The washing is continued until the wash water no longer contains chloride ion. The granular solid is then filtered and placed in a vacuum desiccator to dry. The yield of the granular solid is greater than 90% of the theoretical. The softening point of the solid is in the range of 120–140° C.

Example 6

Into a reaction vessel equipped with a stirrer, reflux condenser and thermometer are placed 16 parts of dithioammelide, 14.5 parts of 86% potassium hydroxide, and 100 parts of 50% aqueous ethylene glycol monoethyl ether. When complete solution is obtained, 14.3 parts of $\beta,\beta'$-dichloroethyl ether is added and the mixture is refluxed. Some solids separate after the first 40 minutes of reflux, and 50 additional parts of ethylene glycol monoethyl ether is added. After approximately 8 hours of reflux, the reaction mixture is cooled, diluted with 225 parts of water, and the solids are filtered. The solids are then washed with water, slurried in dilute acetic acid, refiltered, washed and air dried. The yield of slightly colored solid is 16 parts. When heated, the material softened in a manner similar to that of a thermoplastic resin.

Example 7

A mixture of 28.8 parts of dithioammelide, 7.6 parts of N,N-di-(2-ethylhexyl) dithioammelide, 16 parts of sodium hydroxide and 200 parts of water are placed in a reaction vessel equipped with a stirrer and reflux condenser and stirred to form a solution. There is then added 34.5 parts of $\beta,\beta'$-dichloroethyl formal and the entire mixture is refluxed for 3 hours, during which time a resinous polymer precipitates. The precipitate is crushed into fines and is then washed with water and dried in an oven at 105° C. The yield is approximately 85% of the theoretical.

Example 8

The procedure of Example 7 is followed using the following ingredients:

| | Parts |
|---|---|
| Dithioammelide | 28.8 |
| N,N-diphenylethyl dithioammelide | 7.3 |
| Sodium hydroxide | 16 |
| Water | 200 |
| $\beta,\beta'$-Dichloroethyl formal | 34.5 |

The results obtained are similar to those of Example 7.

Example 9

A mixture of 54.2 parts of $\beta,\beta'$-dichloroethyl formal, 260 parts of water, and 10 parts of ammonium caseinate is homogenized to form a white, foamy emulsion. To this emulsion are added 50 parts of dithioammelide, 25.1 parts of caustic soda and 550 parts of water. The resulting mixture is passed through a homogenizer and a yellow emulsion is obtained. The yellow emulsion is placed in a reaction vessel equipped with reflux condenser, stirrer and thermometer and is refluxed for one hour. At this time the reaction mass contains a fine suspension and the mass is passed through a homogenizer to obtain a white emulsion containing about 8.5% solids. This emulsion when applied to textiles, imparts a finish characterized as "lively." Coagulation of part of the emulsion yields a yellow, pliable resin.

Example 10

Into a reaction vessel equipped with a reflux condenser, stirrer, and thermometer are placed 224 parts of dithioammelide, 112 parts of sodium hydroxide, 700 parts of ethylene glycol monoethyl ether and 50 parts of water. The temperature is raised to reflux over a period of about 20 minutes at which time the mixture resembles a thick slush. At this point 242 parts of $\beta,\beta'$-dichloroethyl formal are added dropwise over a period of 90 minutes and the mixture is refluxed an additional 2 hours. The hot reaction mixture is filtered and the solids are washed with ethylene glycol monoethyl ether. Additional solids are recovered from the filtrate by coagulation and washing with dilute acetic acid. The solids are combined and washed with water until free of chloride ion. After drying there is obtained 300 parts of a yellow resin which can be drawn into threads much like taffy.

Example 11

26.5 parts of dithioammelide, 13.2 parts of sodium hydroxide, and 150 parts of water are placed in a reaction vessel equipped with a stirrer, reflux condenser and thermometer and stirred to form a solution. To this solution at 40° C. is added 53.5 parts of 1,3-bis[$\beta$-($\beta'$-chloroethoxy)ethoxy] benzene. The mixture is then refluxed for 7 hours with the formation of a tan-colored precipitate. The precipitate is washed 3 times with water and dried 24 hours in an oven at 105° C. Forty-nine parts of a brownish-yellow, translucent polymer is obtained. The yield is 81% of the theoretical.

Example 12

The general procedure of Example 1 is followed in preparing products of reaction from the disodium salt of dithioammelide and approximately stoichiometrical proportions of each of the reactants specified in the following table:

| Reactant | Reaction Medium | Time (Hours) | Temp. | Approx. Yield, percent | Nature of Product |
|---|---|---|---|---|---|
| A. Ethylene dichloride | 50 pts. water; 50 pts. ethylene glycol monoethyl ether. | 3 | slow reflux | 30 | yellow, amorphous solid. |
| B. Dichloroisopropyl ether | ----do---- | 10 | 85–95° C | 70 | gray, flexible solid. |
| C. 1,2,3-Trichloropropane | ethylene glycol monoethyl ether. | 2 | slow reflux | 61 | light tan, amorphous solid, softening point 130–135° C. |
| D. 1,3-Dichloropropanol-2 | water | 1¼ | ----do---- | 75 | tan-colored, amorphous solid. |
| E. 1,4-Dichloropentene-2 | ----do---- | 2 | ----do---- | 23 | black, brittle solid—disagreeable odor. |
| F. β,β'-dichloroisopropyl acetate | ethylene glycol monoethyl ether. | 2 at +½ at | 110–150° C slow reflux | 55 | white, amorphous solid. |
| G. Bis(β-chloromethoxy-ethyl) ether. | water | 2½ | 85–95° C | 40 | Do. |

Example 13

Into a reaction vessel equipped with a thermometer, reflux condenser and stirrer are placed 12 parts of dithioammelide, 3.1 parts of sodium hydroxide, 5 parts of water and 150 parts of ethylene glycol monoethyl ether. A clear, orange solution is formed. To this solution is added 17.5 parts of bis-[β-(β'-chloroethoxy)ethyl] ether. The mixture is then heated for 3 hours at a slow reflux. The ethylene glycol monoethyl ether is distilled off and the residue is washed with water. The product is a cream-colored, tacky, plastic solid; yield is about 90% of the theoretical.

Example 14

26.6 parts of dithioammelide, 6.6 parts of sodium hydroxide, 5 parts of water, and 200 parts of ethylene glycol monoethyl ether are placed in a reaction vessel equipped with a stirrer and reflux condenser. There forms an orange-colored solution. To this solution is added 31 parts of α,β-bis(β'-chloroethoxy)ethane. After heating the slow reflux for a period of 3 hours, the water is distilled off azeotropically. A cream-colored precipitate is then filtered off and washed with hot water. Calculated yield of product is about 53%.

Example 15

32 parts of dithioammelide, 22 parts of potassium hydroxide, 200 parts of water, and 40.4 parts of trimethylene dibromide are placed in a reaction vessel equipped with stirrer and reflux condenser. The mixture is heated with stirring for 4 hours at a temperature of approximately 95° C. There forms a coagulated, solid mass in the mixture. This solid mass is isolated by filtration, and is then washed with water and dried at 105° C. for 24 hours in a hot air oven. There is obtained 28 parts of a hard, brittle, light brown solid.

Example 16

Into a reaction vessel equipped with a reflux condenser, thermometer, and stirrer are placed 128 parts of dithioammelide, 88 parts of potassium hydroxide, 800 parts of water, and 50 parts of acetone. The resulting orange solution is heated to 85° C., and there is then added 116 parts of β,β'-dichloroethyl ether. After 4 hours at 90° C. a light precipitate forms. The precipitate is filtered, washed and dried. It is a light-colored solid which softens at 100° C. and melts as 140° C.

It will be understood, of course, by those skilled in the art that my invention is not limited to the specific halogenated compounds, triazine derivatives and other materials named in the above illustrative examples.

The resinous compositions of this invention may be modified in various ways, for example, by effecting the reaction between the polyhalogenated compound and the triazine derivative in the presence of various modifying agents. For instance, the reaction may be effected in the presence of a monohalogenated compound, or in the presence of waxes or wax-like bodies or various natural or synthetic resins or gums.

Certain of the linear polymers of the present invention, more particularly those which contain at least one hydrogen atom attached to the nitrogen atom of the amino grouping of the triazine nucleus, are especially suitable for use in the preparation of thermosetting resinous compositions. For example, such polymers or polymers obtained by reacting a polyhalogenated compound of the kind used in practicing this invention with a mixture of (1) a dithioammelide having an unsubstituted or partially substituted amino grouping attached to the triazine nucleus and (2) a dithioammelide having both of its hydrogen atoms of the amino grouping replaced by a monovalent hydrocarbon radical, more particularly an alkyl, cycloalkyl, aralkyl, aryl or alkaryl radical, can be reacted with an aldehyde, e. g., formaldehyde, as more fully described and claimed in my copending application Serial No. 225,682, filed concurrently herewith.

The resinous materials of this invention also may be employed as modifiers, more particularly as plasticizers, for other synthetic resins, in order to impart toughness or improved plasticity to resins which otherwise are excessively brittle or have poor plasticity. They may be co-reacted with various aldehyde-reaction products, for instance, partial reaction products of an aldehyde, e. g., formaldehyde, and phenol or a substituted phenol, urea or a substituted urea, melamine or other aminotriazine, etc.

Other uses of the products of the present invention include adhesive, casting, molding and coating compositions, as well as textile-treating compositions, or as components of such compositions.

My new synthetic materials may be used alone or admixed with various fillers, pigments, dyes or other modifying agents, e. g., phenol-aldehyde resins, urea-aldehyde resins, melamine-aldehyde resins, alkyd resins, cellulose esters, cellulose ethers, hydrocarbon-substituted polysiloxane resins, etc. The soluble polymers may be dissolved in various solvents or solvent mixtures, e. g., solvent naphtha, xylene, benzene, toluene, butanol, methyl ethyl ketone, amyl acetate, etc., or suitable mixtures thereof, to form coating and impregnating compositions of any desired viscosity. Such compositions may have incorporated therein linseed oil, tung oil, soya bean oil or acids thereof, or other drying or semi-drying oils or acids, as well as driers, more particularly metallic driers, e. g., cobalt naphthenate, manganese naphthenates cobalt resinate, etc., to improve the adhesive and drying characteristics of the composition.

I claim:

1. A composition comprising a synthetic polymeric material obtained by effecting reaction under heat between ingredients including (1) a triazine derivative represented by the general formula—

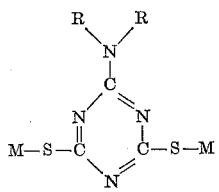

where R represents a member selected from the group consisting of hydrogen, alkyl, cycloalkyl, aralkyl, aryl and alkaryl radicals and M represents an alkali metal and (2) a compound having at least two but not more than three halogen atoms selected from the class consisting of chlorine and bromine atoms and which are attached to a radical selected from the group consisting of polyvalent hydrocarbon and oxyhydrocarbon radicals, each halogen being attached to a carbon atom in which all four valences are satisfied by single bonds.

2. A composition according to claim 1 wherein R represents hydrogen.

3. A composition according to claim 1 wherein R represents an alkyl radical.

4. A composition according to claim 1 in which the halogen compound is $\beta,\beta'$-dichloroethyl formal.

5. A composition according to claim 1 in which the halogenated compound is $\beta,\beta'$-dichlorethyl ether.

6. A composition according to claim 1 in which the halogenated compound is 1,3-bis[$\beta$-($\beta'$-chloroethoxy)-ethoxy] benzene.

7. A composition according to claim 1 in which the halogenated compound is $\alpha,\beta$-bis($\beta'$-chloroethoxy) ethane.

8. A composition according to claim 1 in which the halogenated compound is bis-[$\beta$-($\beta'$-chloroethoxy) ethyl] ether.

9. A linear polymer which is the product of a condensation reaction under heat between ingredients including $\beta,\beta'$-dichloroethyl ether and a di-(alkali-metal) salt of dithioammelide.

10. A linear polymer which is the product of a condensation reaction under heat between ingredients including $\beta,\beta'$-dichloroethyl formal and a di-(alkali-metal) salt of dithioammelide.

11. A linear polymer which is the product of a condensation reaction under heat between ingredients including 1,3-bis[$\beta$-($\beta'$-chloroethoxy) ethoxy] benzene and a di-(alkali-metal) salt of dithioammelide.

12. A linear polymer which is the product of a condensation reaction under heat between ingredients including $\alpha,\beta$-bis($\beta'$-chloroethoxy) ethane and a di-(alkali-metal) salt of dithioammelide.

13. A linear polymer which is the product of a condensation reaction under heat between ingredients including bis-[$\beta$-($\beta'$-chloroethoxy) ethyl] ether and a di-(alkali-metal) salt of dithioammelide.

14. The method of preparing polymeric materials which comprises heating, at a temperature not exceeding about 150° C., a mixture containing (1) a triazine derivative represented by the general formula—

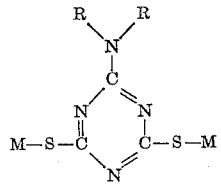

where R represents a radical selected from the group consisting of hydrogen, alkyl, cycloalkyl, aralkyl, aryl and alkaryl radicals and M represents an alkali metal and (2) a compound having at least two but not more than three halogen atoms selected from the class consisting of chlorine and bromine atoms and which are attached to a radical selected from the group consisting of polyvalent hydrocarbon and oxyhydrocarbon radicals, each halogen being attached to a carbon atom in which all four valences are satisfied by single bonds.

15. A method according to claim 14 in which the reaction is effected in a medium comprising water and the halogenated compound is emulsified in water preliminary to the reaction.

JACK T. THURSTON.

References Cited in the file of this patent

UNITED STATES PATENTS

| Number | Name | Date |
|---|---|---|
| 2,211,709 | Zerweck | Aug. 13, 1940 |
| 2,217,667 | Bruson | Oct. 15, 1940 |
| 2,481,156 | Schaefer | Sept. 6, 1949 |

FOREIGN PATENTS

| Number | Country | Date |
|---|---|---|
| 576,163 | Great Britain | Mar. 21 1946 |